(12) United States Patent
Schulz-Andres et al.

(10) Patent No.: US 8,425,204 B2
(45) Date of Patent: Apr. 23, 2013

(54) PUMP

(75) Inventors: Heiko Schulz-Andres, Hueckeswagen (DE); Dirk Kamarys, Willich (DE); Kornelia Frowein, Wermelskirchen (DE)

(73) Assignee: LuK Automobiltechnik GmbH & Co. KG, Hueckeswagen (DE)

( * ) Notice: Subject to any disclaimer, the term of this patent is extended or adjusted under 35 U.S.C. 154(b) by 154 days.

(21) Appl. No.: 11/629,644

(22) PCT Filed: Jun. 15, 2005

(86) PCT No.: PCT/DE2005/001058
§ 371 (c)(1),
(2), (4) Date: Oct. 29, 2007

(87) PCT Pub. No.: WO2006/000181
PCT Pub. Date: Jan. 5, 2006

(65) Prior Publication Data
US 2008/0181796 A1 Jul. 31, 2008

(30) Foreign Application Priority Data
Jun. 24, 2004 (DE) .......................... 10 2004 030 474

(51) Int. Cl.
*F04B 49/00* (2006.01)
*F16K 15/16* (2006.01)
(52) U.S. Cl.
USPC .......................... 417/292; 417/311; 137/857
(58) Field of Classification Search ................... 417/32, 417/213, 27, 292, 299, 307, 310, 311, 440, 417/569, 228, 406, 410.3; 251/11; 137/517, 137/857, 855, 79–80; 236/74, 93 R, 99 F, 236/99 G; 418/23, 133, 259, 270
See application file for complete search history.

(56) References Cited

U.S. PATENT DOCUMENTS

| | | | | | |
|---|---|---|---|---|---|
| 2,768,585 | A | * | 10/1956 | Hardy | 417/213 |
| 2,839,007 | A | * | 6/1958 | Benedek | 418/236 |
| 3,031,861 | A | * | 5/1962 | McCormack | 62/196.3 |
| 3,250,460 | A | * | 5/1966 | Cassidy et al. | 418/87 |
| 3,394,687 | A | * | 7/1968 | Scott | 123/552 |
| 3,809,511 | A | * | 5/1974 | Linder et al. | 418/259 |
| 3,811,792 | A | * | 5/1974 | Kennedy, Jr. | 417/28 |
| 4,060,343 | A | * | 11/1977 | Newton | 417/309 |
| 4,253,491 | A | * | 3/1981 | Worthen et al. | 137/601.2 |
| 4,446,835 | A | * | 5/1984 | Mowbray | 123/450 |
| 4,542,768 | A | * | 9/1985 | Harris | 137/856 |
| 4,557,670 | A | * | 12/1985 | Inagaki et al. | 417/299 |
| 4,558,993 | A | * | 12/1985 | Hori et al. | 417/283 |

(Continued)

FOREIGN PATENT DOCUMENTS
DE   35 06 629 A1   10/1985
DE   40 33 456 A1   4/1992
(Continued)

*Primary Examiner* — Charles Freay
*Assistant Examiner* — Alexander Comley
(74) *Attorney, Agent, or Firm* — Davidson, Davidson & Kappel, LLC

(57) ABSTRACT

Pump, for example for pumping lubricating oil in an internal combustion engine, more particularly a multi-stroke vane cell pump, with a rotor and vanes which can slide at least radially in rotor slots and have vane heads that slide along a stroke contour, the stroke contour having a radial outlet that can be closed by a valve device.

29 Claims, 3 Drawing Sheets

U.S. PATENT DOCUMENTS

| | | | |
|---|---|---|---|
| 4,566,863 A * | 1/1986 | Goto et al. | 417/295 |
| 4,628,963 A * | 12/1986 | Ishijima et al. | 137/857 |
| 4,681,517 A * | 7/1987 | Schulz et al. | 417/300 |
| 4,697,994 A * | 10/1987 | Ishizawa et al. | 418/8 |
| 4,722,672 A * | 2/1988 | Rinneer | 417/310 |
| 4,726,740 A * | 2/1988 | Suzuki et al. | 417/295 |
| 4,744,732 A * | 5/1988 | Nakajima et al. | 417/295 |
| 4,750,867 A * | 6/1988 | Hertell et al. | 417/295 |
| 4,778,352 A * | 10/1988 | Nakajima | 417/295 |
| 4,801,251 A * | 1/1989 | Nakajima et al. | 417/295 |
| 4,813,853 A * | 3/1989 | Otto et al. | 417/295 |
| 4,818,189 A * | 4/1989 | Nakajima | 417/295 |
| 4,844,703 A * | 7/1989 | Watanabe et al. | 417/295 |
| 4,927,332 A * | 5/1990 | Fischer et al. | 417/299 |
| 5,030,066 A * | 7/1991 | Aihara et al. | 417/295 |
| 5,074,761 A * | 12/1991 | Hirooka et al. | 417/310 |
| 5,209,653 A * | 5/1993 | Murray et al. | 417/410.1 |
| 5,249,939 A * | 10/1993 | Takahashi | 417/569 |
| 5,277,028 A * | 1/1994 | Worner et al. | 60/468 |
| 5,466,135 A * | 11/1995 | Draskovits et al. | 418/268 |
| 5,489,195 A * | 2/1996 | Domagalla et al. | 417/68 |
| 5,595,214 A * | 1/1997 | Shaffer et al. | 137/517 |
| 5,720,603 A * | 2/1998 | Miller et al. | 418/180 |
| 5,899,218 A * | 5/1999 | Dugan | 137/1 |
| 6,095,773 A * | 8/2000 | Merz | 417/540 |
| 6,298,813 B1 * | 10/2001 | Asakura et al. | 123/90.18 |
| 6,367,605 B1 * | 4/2002 | Middelmann et al. | 192/3.3 |
| 6,499,963 B2 * | 12/2002 | Repple et al. | 417/292 |
| 6,558,132 B2 * | 5/2003 | Hanggi | 417/220 |
| 6,592,346 B2 * | 7/2003 | Bushnell | 418/63 |
| 6,823,896 B2 * | 11/2004 | Hong | 137/856 |
| 6,893,233 B2 * | 5/2005 | Hong | 417/569 |
| 7,059,838 B2 * | 6/2006 | Draskovits et al. | 417/297 |
| 7,222,641 B2 * | 5/2007 | Peric | 137/855 |
| 2002/0187050 A1 * | 12/2002 | Narney et al. | 417/53 |
| 2003/0012665 A1 * | 1/2003 | Schneider | 417/310 |
| 2003/0113216 A1 * | 6/2003 | Draskovits et al. | 417/307 |
| 2004/0136841 A1 * | 7/2004 | Takahashi et al. | 417/310 |
| 2004/0165993 A1 * | 8/2004 | Tabuchi et al. | 417/213 |
| 2005/0142010 A1 * | 6/2005 | Bailey et al. | 417/423.5 |

FOREIGN PATENT DOCUMENTS

| | | |
|---|---|---|
| DE | 44 12 980 A1 | 11/1994 |
| EP | 0 255 920 | 2/1988 |
| GB | 2 277 558 | 11/1994 |
| JP | 11 201063 | 7/1999 |

* cited by examiner

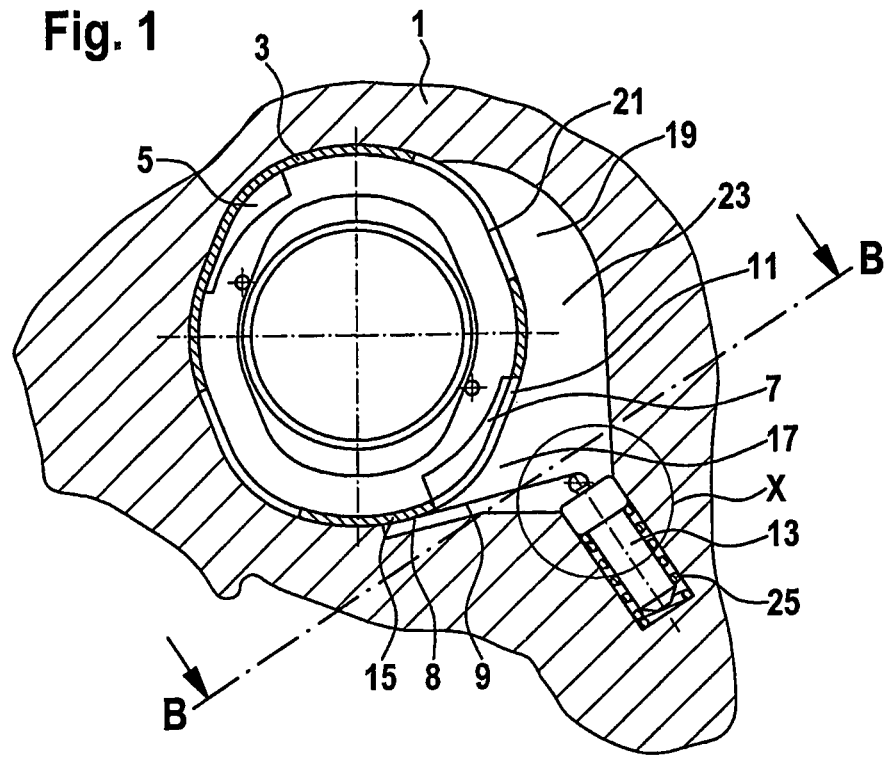
Fig. 1
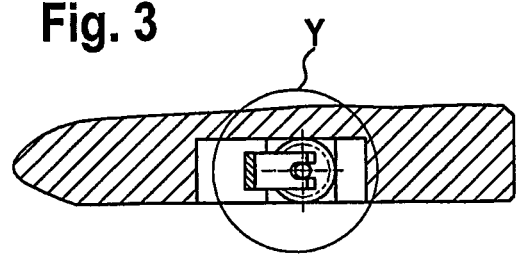
Fig. 3
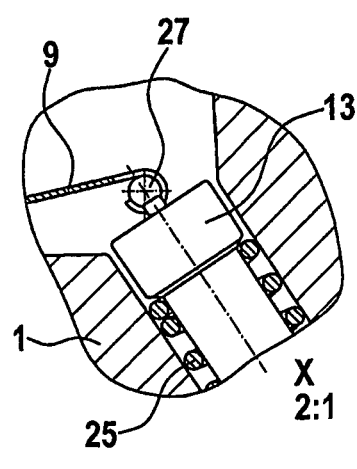
Fig. 2
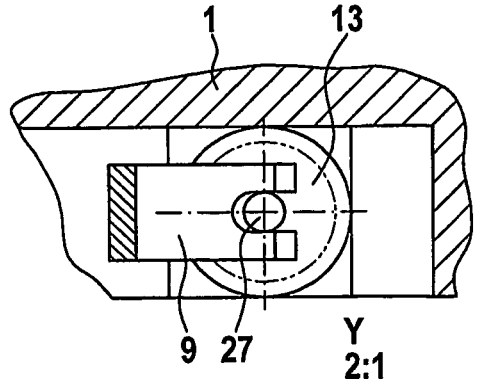

PUMP

BACKGROUND

The present invention relates to a pump, for example, for pumping lubricating oil of an internal combustion engine, in particular a multistroke vane-cell pump, having a rotor and vanes which are at least radially displaceable in rotor slots, whose vane heads slide along a stroke contour, the stroke contour having, among other things, a radial outlet opening, which is closeable by a valve device.

Such pumps are known. Thus, for example, a multistroke vane-cell pump whose stroke contour is made of sheet metal is known. In this pump, the switchable second pumping stage is directly connected to the intake area of the first pumping stage via a radial groove in the sheet metal contour in the event of low temperature of the lubricating oil, so that at a low temperature only the first stage of the double-stroke vane-cell pump pumps. When the temperature increases, the switching stage, i.e., stage 2 of the vane-cell pump, is closed by an element which is adjustable as a function of the temperature, in such a way that the second stage of the double-stroke vane-cell pump also pumps the lubricating oil under pressure into the lubricating oil channels of the engine. The temperature-dependent switching also closes this radial groove and the volume flow is supplied to the system pressure area via a check valve. The valve, which is adjustable as a function of the temperature, is opened and closed with the aid of a conical seat. The disadvantage of this approach is the small flow cross sections that may be achieved, resulting in an excessive pressure drop; in addition, the flow around the valve seat results, for part of the volume flow, in a flow directed against the actual intake volume flow. These flows result in losses which cause an early onset of cavitation in the intake area. Furthermore, the manufacture of the seat valve is very complicated and is therefore expensive.

SUMMARY OF THE INVENTION

An object of the present invention is to develop an adjustable valve which performs the adjustment function in a cost-effective manner and offers the lowest possible flow resistance and an outlet flow directed toward the intake flow.

This object is achieved by a pump, for example, for pumping lubricating oil of an internal combustion engine, in particular a multistroke vane-cell pump, having a rotor and vanes which are at least radially displaceable in rotor slots, whose vane heads slide along a stroke contour, the stroke contour having, among other things, a radial outlet opening, which is closeable by a valve device, the valve device having, according to the present invention, an elastically deformable valve tongue which is mounted on the stroke contour tangentially on the outside in such a way that in the open position in the direction of flow the valve tongue makes an outlet flow in the direction of the intake flow possible by the valve tongue essentially representing a flow guide surface parallel to the outlet flow. According to the present invention, in the closed state the valve tongue essentially assumes the contour shape on the outside of the stroke contour in the area of the outlet opening. Furthermore, a pump is preferable in which the pump tongue is opened by the spring force of the elastic tongue material. It has the advantage that the open valve represents minimum flow resistance and therefore the hydraulic efficiency and the mechanical efficiency of the pump may be substantially improved.

A pump according to the present invention is characterized in that the valve tongue is pressed in the closed position from the outside against the stroke contour by an actuator that is adjustable as a function of the temperature and/or an additional spring. The actuator that is adjustable as a function of the temperature and the additional spring are preferably connected in series with regard to the adjustment path and adjustment forces generated by these two elements. Furthermore, the actuator that is adjustable as a function of the temperature is to close the valve device when the temperature increases.

In addition, a pump is preferred in which the additional spring is able to hold the pump device closed until a certain pressure is attained. This has the advantage that, in addition to the valve device that is adjustable as a function of the temperature, a pressure limiting function may also be implemented. Furthermore, a pump is preferred in which the spring force of the valve tongue acts against the spring force of the additional spring. In addition, a pump is preferred in which the actuator that is adjustable as a function of the temperature influences the spring pre-tension force of the additional spring. This has the advantage that, depending on the design of the actuator and the additional spring, different pressure limiting levels may be set. Furthermore, a pump is preferred in which the valve device may perform both the function of a valve that is adjustable as a function of the temperature and the function of a pressure limiting valve. This has the advantages that the second stage may be switched on when the temperature increases, while the second stage may be switched off again when a maximum pressure is exceeded.

Another pump according to the present invention is characterized in that the valve tongue is attached to the side of the radial outlet opening of the stroke contour through which the vanes pass first. This has the advantage that when the valve tongue is opened, it represents a flow guide surface in the direction of flow in a hydraulically advantageous manner, allowing a low-loss flow pattern to be produced.

Furthermore, a pump is preferred in which both the stroke contour and the valve tongue are made of sheet metal, preferably a thin spring steel, and are preferably attached to one another by laser welding, discharge welding, or soldering.

A pump is also preferred in which the actuator that is adjustable as a function of the temperature is connected to the valve tongue on one side and is supported by the additional compression spring on the other side. Furthermore, with the actuator that is adjustable as a function of the temperature in the retracted position, the additional compression spring is to hold the valve device closed using minimum pre-tension (minimum pressure limitation). This has the advantage that, at low temperatures, a minimum pressure, for example, of 2 bar, may be maintained for low-loss lubrication and, when the pressure is exceeded, the second stage may be switched to pressureless recirculation to save power.

Furthermore, a pump is preferred in which the additional spring maintains the valve device closed using maximum pre-tension with the actuator that is adjustable as a function of the temperature extended (maximum pressure limitation). This has the advantage that, for example, at high temperature, a lubricating oil pressure of 5 bar, for example, may be attained before the second pressure stage is switched to recirculation pressure for power saving.

The pump according to the present invention is characterized in that the valve tongue may be pressed against the stroke contour by the actuator that is adjustable as a function of the temperature using a molded element, possibly having an articulation or hinge device. This has the advantage that an absolutely form-fitting sealing of the valve tongue is ensured by the shape of the element. Therefore, a pump is preferred in particular in which the contact surface of the molded element corresponds to the outside contour of the stroke contour.

Furthermore, a pump is preferred in which the valve tongue is made from a thermostatic bimetal. This has the advantage that via precise tuning with the actuator switching point, a large force becomes available for opening the second stage and a small force acts against the actuator during closing.

Furthermore, a pump is preferred in which the valve tongue is made from a sheet metal strip in the form of an over-dead-center spring having a snap effect. This has the advantage that the counterpressure in pressureless recirculation of the second stage may be substantially reduced again, which results in improved hydraulic mechanical efficiency. The actuator applies the force for closing the valve device, while the static and dynamic pressure of the second stage generates the force for opening.

BRIEF DESCRIPTION OF THE DRAWINGS

The invention is now described with reference to the figures.

FIG. 1 shows a pump according to the present invention in cross section.

FIG. 2 shows an enlarged detail X of FIG. 1.

FIG. 3 shows an enlarged detail Y, the top view onto the actuator, and the valve tongue.

DETAILED DESCRIPTION

Figure 4A:
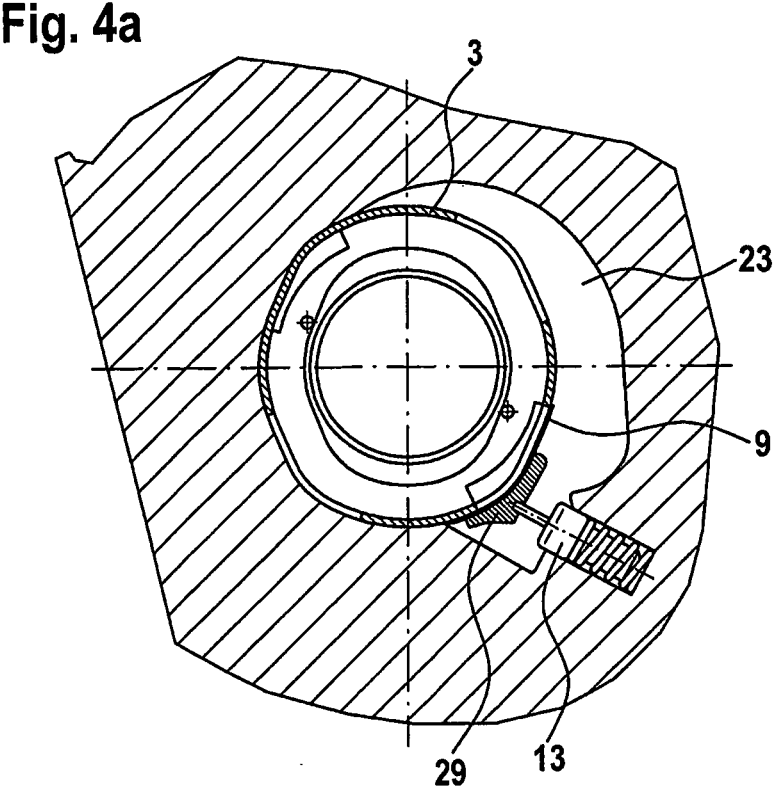
FIG. 4 shows an actuator having a fixedly integrated molded element.

FIG. 1 shows a two-stroke vane-cell pump in cross section. A stroke contour 3 in the form of a sheet metal ring is shown in a pump housing 1. Stroke contour 3 contains a first pressure outlet 5 and a second pressure outlet 7, a spring tongue valve 8 being situated at second pressure outlet 7. In the area of second pressure outlet 7, stroke contour 3 is interrupted by a radial outlet opening 11. This outlet opening 11 is closed by valve tongue 9 when actuator 13 that is adjustable as a function of the temperature is extended and valve tongue 9 is pressed against stroke contour ring 3. Valve tongue 9 is attached to stroke contour ring 3 in area 15, so that in the open state of the tongue valve illustrated here, unimpeded flow through outlet opening 11 in flow area 17 of the pump may take place. The outflow from area 17, with valve tongue 9 functioning as a flow guide wall here, is again supplied to the actual rotation unit of the double-stroke vane-cell pump in area 19 of flow channel 23, which surrounds contour ring 3, through a radial intake opening 21 in contour ring 3. The other elements of a double-stroke vane-cell pump such as the rotor and the vanes are not depicted here, but are known from the related art and are not further elucidated here for the sake of simplicity. It is essential for the present invention that, for reducing the flow resistance and optimizing the flow direction in area 17 of flow channel 23, valve tongue 9 made of a thin spring metal sheet is attached to sheet metal stroke contour ring 3 in area 15 by laser welding, for example. This valve tongue is therefore attached to the side of outlet opening 11 and of outlet area 7 of stroke contour 3 which the vanes pass by first in the direction of rotation. The flow is thus directed into intake channel 23 when the tongue valve is open. The complete channel cross section is thus available for the flow in area 17 when the tongue valve is open. This results in minimum flow resistance.

To close outlet opening 11, actuator 13 that is adjustable as a function of the temperature is provided, which here in FIG. 1 is directly connected to valve tongue 9. On its other side, actuator 13 is supported by an additional spring 25. Spring 25 is selected in such a way that when actuator 13 is retracted, there is a minimum pre-stress by the valve in the closed state, which is not depicted here in FIG. 1 this time. This means that the actuator is retracted, but additional spring 25, together with the actuator, presses spring tongue 9 against outlet opening 11. The minimum pre-stress may correspond, for example, to an outlet pressure of 2 bar, and as soon as this outlet pressure is exceeded in the pump, the pressure is able to press the spring tongue valve into the open position depicted in FIG. 1 and thus press actuator 13 into the position depicted here against the pre-stress force of spring 25. The setpoint of the minimum pressure limitation is thus exceeded in FIG. 1. The equilibrium of forces acting on the valve device in FIG. 1 is made up of the pre-stress of compression spring 25 less the restoring effect by the spring force of valve tongue 9. The pressure force of the hydraulic medium in outlet area 7 and possibly the forces applied by the flow act supportively in the opening direction. If actuator 13 is extended due to the increase in the lubricating oil temperature, spring tongue 9 of the tongue valve is pressed against stroke ring 3 on one side, but also the pre-stress force of spring 25 increases due to extending actuator 13, and outlet opening 11 of the switchable pump stage is closed. Because the pre-stress of spring 25 has now been increased, the corresponding pumping pressure is unable to press spring tongue 9, together with extended actuator 13, against the force of spring 25 again in the direction of opening and thus to perform the function of maximum pressure limitation until a pressure of 5 bar, for example, is reached. Therefore, according to the present invention, a superimposition of functions of two different pressure limiting stages is combined with a temperature adjustability by closing outlet opening 11 when the temperature increases. The maximum pressure limitation of 5 bar, for example, is implemented by actuator 13 via the overstroke effect because the actuator extends further as the temperature continues to rise, and thus the pre-stress of additional spring 25 further increases until this spring force pre-stress corresponds to the maximum pressure of 5 bar, for example. The exact temperature adjustment and pressure points may, of course, be varied according to the present invention for the different requirements in the motor vehicles. One advantage of this valve device according to the present invention compared to the related art is that a restoring spring present in the latter may be omitted. Furthermore, spring 25, which in this case assumes the function of the overstroke spring, may have a more compact design because this system allows the valve device to be opened at lower pressures.

When an engine is stopped after it has properly warmed up (both pressure stages of the double-stroke vane-cell pump have pumped), the reduction in temperature causes actuator 13 to retract. The restoring forces needed therefore are applied by compression spring 25, which initially compresses actuator 13. Because the pre-stress of spring 25 decreases with the retraction of actuator 13, an intermediate position caused by hysteresis may result. This is, however, beneficial for the next cold start of the pump because the higher pre-stress results in a start using both pump stages. As soon as the second pump stage has built up pressure, the actuator hysteresis is overcome and the actuator retracts entirely.

Actuator 13 is positioned in relation to spring tongue 9 as a function of a diagram of forces. It may be convenient to place actuator 13 in such a way that it braces spring tongue 9 against stroke ring 3. To do so, a bearing device must be provided between actuator 13 and spring tongue 9, as depicted in FIG. 2. It is thus possible to produce this form-fitting bearing device via a sphere 27 on actuator 13, for example, and a corresponding receptacle on spring tongue 9. FIG. 3 shows a bearing device between actuator 13 and spring tongue 9 in top view.

Figure 4B:
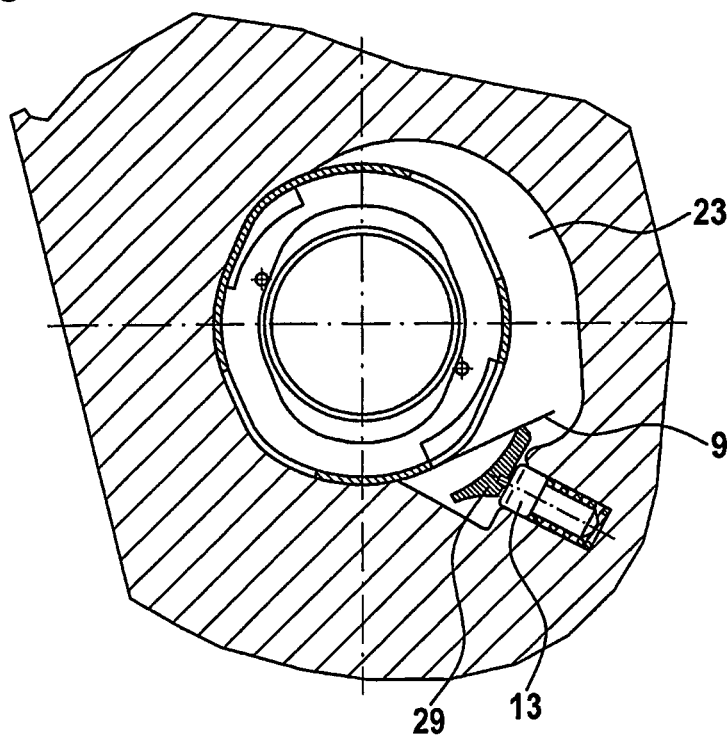

In another variant according to the present invention, spring tongue 9 is pressed onto stroke ring 3 with the aid of an additional molded element 29 (FIGS. 4a and 4b). This molded element 29 may be manufactured from different materials, preferably from plastic, and its contact surface for spring tongue 9 corresponds to the outer contour of stroke ring 3. Spring tongue 9 is then bent by molded element 29 and pressed onto contour ring 3. Molded element 29 is rigidly connected to actuator 13.

Figure 5A:
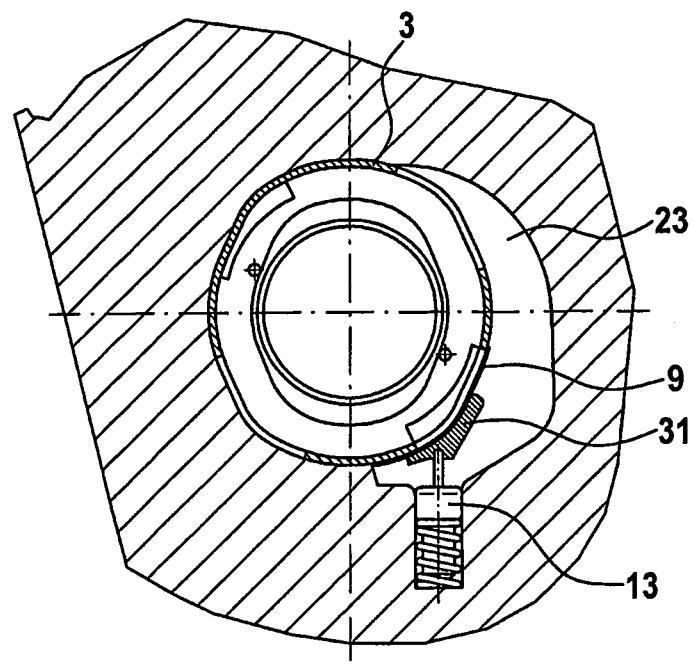
FIG. 5 shows an actuator having a movable molded element.
Figure 5B:
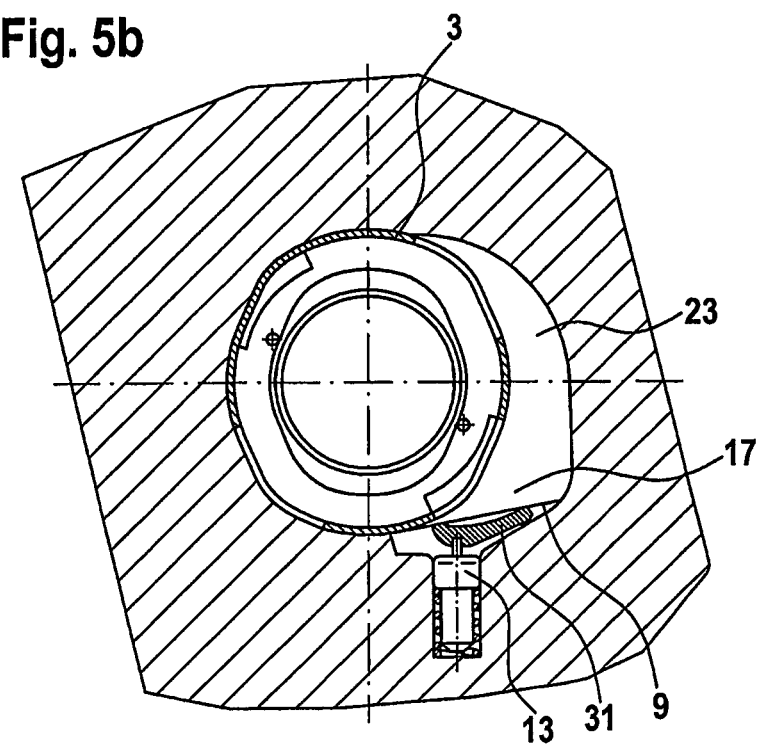

FIG. 5 shows an embodiment which may be necessary for reasons of installation space. Molded element 31 is mounted movably with respect to actuator 13 and may thus be rotated away from stroke contour ring 3. This results in a fully open flow cross section in discharge area 17 of the valve device. In both specific embodiments in FIGS. 4 and 5, a power-saving discharge in intake area 23 of the double-stroke vane-cell pump is ensured by spring tongue 9, which represents a tangential flow guide plate for the discharge flow.

Another alternative according to the present invention lets molded element 29 or 31 close or open outlet opening 7 directly, without a spring tongue 9 installed in-between. To achieve an appropriate sealing effect, molded element 29 or 31 may be made of an elastomer for this purpose.

LIST OF REFERENCE NUMERALS

1 pump housing
3 stroke contour
5 first pressure outlet
7 second pressure outlet
8 spring tongue valve
9 valve tongue
11 radial outlet opening
13 actuator that is adjustable as a function of the temperature
15 valve tongue attachment area
17 flow area around the stroke contour
19 flow channel intake area
21 radial intake opening
23 flow channel
25 additional spring
27 spherical bearing device on actuator
29 additional molded element on actuator
31 movably mounted molded element

What is claimed is:

1. A pump comprising:
a rotor having rotor slots and vanes, the vanes being at least radially displaceable in the rotor slots;
a stroke contour, the vanes having vane heads sliding along the stroke contour, the stroke contour having a radial outlet opening;
a valve device, the radial outlet opening closeable by the valve device, the valve device including an elastically deformable valve tongue situated tangentially outside on the stroke contour so that the valve tongue permits an outlet flow to be directed around the stroke contour in a direction of the intake flow, the valve tongue forming a flow guide surface parallel to the outlet flow; and
an actuator, the actuator being connected to the valve tongue on an end opposite of where the valve tongue is attached to the stroke contour.

2. The pump as recited in claim 1 wherein in the closed state, the valve tongue assumes the shape of the stroke contour in the area of the radial outlet opening.

3. The pump as recited in claim 1 wherein the valve tongue is opened by a spring force of an elastic material of the valve tongue.

4. A pump comprising:
a rotor having rotor slots and vanes, the vanes being at least radially displaceable in the rotor slots;
a stroke contour, the vanes having vane heads sliding along the stroke contour, the stroke contour having a radial outlet opening;
a valve device, the radial outlet opening closeable by the valve device, the valve device including an elastically deformable valve tongue situated tangentially outside on the stroke contour so that the valve tongue permits an outlet flow to be directed around the stroke contour in a direction of the intake flow, the valve tongue forming a flow guide surface parallel to the outlet flow; and
an actuator adjustable as a function of temperature connected to the valve tongue;
wherein the valve tongue is pressed in a closed position from an outside surface of the valve tongue against the stroke contour by the actuator and by an additional spring.

5. The pump as recited in claim 4 wherein the actuator and the additional spring are connected in series with respect to adjustment paths and adjustment forces generated by the actuator and additional spring.

6. The pump as recited in claim 4 wherein the actuator closes the valve device when the temperature rises.

7. The pump as recited in claim 4 wherein the additional spring is able to hold the pump device closed until a certain pressure is attained.

8. The pump as recited in claim 4 wherein a spring force of the valve tongue acts against a spring force of the additional spring.

9. The pump as recited in claim 4 wherein the actuator influences a spring pre-tension force of the additional spring.

10. The pump as recited in claim 1 wherein the valve device is adjustable as a function of the temperature, and has a pressure limit.

11. The pump as recited in claim 1 wherein the valve tongue is attached to a side of the radial outlet opening of the stroke contour, the vanes initially pass in a direction of rotation by the radial outlet opening stroke contour.

12. The pump as recited in claim 1 wherein the stroke contour and the valve tongue are made of sheet metal.

13. The pump as recited in claim 4 wherein the actuator is connected to the valve tongue on one side and is supported by the additional spring on the other side.

14. The pump as recited in claim 4 wherein when the actuator is in the retracted position, the additional spring holds the valve device closed using a minimum pre-tension.

15. The pump as recited in claim 4 wherein when the actuator is in the extended position, the additional spring holds the valve device closed using a maximum pre-tension.

16. A pump comprising:
a rotor having rotor slots and vanes, the vanes being at least radially displaceable in the rotor slots;
a stroke contour, the vanes having vane heads sliding along the stroke contour, the stroke contour having a radial outlet opening;
a valve device, the radial outlet opening closeable by the valve device, the valve device including an elastically deformable valve tongue situated tangentially outside on the stroke contour so that the valve tongue permits an outlet flow to be directed around the stroke contour in a direction of the intake flow, the valve tongue forming a flow guide surface parallel to the outlet flow, the valve device including a molded element contacting the valve tongue; and an actuator, the actuator being rigidly or pivotably connected to the molded element, the valve tongue pressable against the stroke contour by the actuator with the aid of the molded element.

17. The pump as recited in claim 16 wherein a contact surface of the molded element corresponds to an outer contour of the stroke contour.

18. The pump as recited in claim 1 wherein the valve tongue is made from a thermostatic bimetal.

19. The pump as recited in claim 1 wherein the valve tongue is made from a sheet metal strip in the shape of an over-dead-center spring having a snap effect.

20. The pump as recited in claim 1 wherein the pump is for pumping lubricating oil of an internal combustion engine including a multistroke vane-cell pump.

21. The pump as recited in claim 12 wherein the sheet metal is a thin spring steel.

22. The pump as recited in claim 12 wherein the stroke contour and valve tongue are attached to one another by laser welding, discharge welding or soldering.

23. The pump as recited in claim 16 wherein the valve tongue has an additional articulation or hinge device.

24. The pump as recited in claim 1 further comprising a housing having a chamber formed therein, the rotor, the stroke contour, the valve device and the actuator being in the chamber.

25. The pump as recited in claim 1 wherein the stroke contour is a ring.

26. The pump as recited in claim 1 wherein the valve tongue is configured to contact an outer circumference of the stroke contour to close the radial outlet opening.

27. The pump as recited in claim 1 wherein the valve tongue is connected to an outer circumferential surface of the stroke contour.

28. The pump as recited in claim 1 wherein the actuator is configured to move the end of the valve tongue opposite of where the valve tongue is attached to the stroke contour toward and away from the outer circumferential surface of the stroke contour.

29. The pump as recited in claim 1 wherein the radial outlet opening extends from an inner circumferential surface of the stroke contour to an outer circumferential surface of the stroke contour.

* * * * *